United States Patent [19]
Mendeleev

[11] Patent Number: 5,309,980
[45] Date of Patent: May 10, 1994

[54] DEVICE FOR HEAT SUPPLY BY CONDUCTIVE HEAT TRANSFER

[76] Inventor: Oscar Mendeleev, Merkaz Klita 64, Mevasseret Zion, Jerusalem 90805, Israel

[21] Appl. No.: 932,474

[22] Filed: Aug. 20, 1992

Related U.S. Application Data

[63] Continuation-in-part of Ser. No. 732,556, Jul. 19, 1991, abandoned.

[30] Foreign Application Priority Data

Apr. 15, 1991 [IL] Israel ............................ 097846

[51] Int. Cl.[5] ........................... F28F 7/00; F24J 3/00; F24H 7/06
[52] U.S. Cl. ................................ 165/53; 165/135; 165/185
[58] Field of Search ................. 165/185, 47, 49, 53, 165/135

[56] References Cited

U.S. PATENT DOCUMENTS

| | | | |
|---|---|---|---|
| 238,469 | 3/1881 | Wood | 165/54 |
| 2,182,686 | 12/1939 | Young | 165/49 |
| 2,544,183 | 3/1951 | Rogers et al. | 165/47 |
| 2,641,449 | 6/1953 | Antony | 165/49 |
| 3,330,333 | 7/1967 | Moss | 165/185 |
| 4,279,241 | 7/1981 | Himes | 165/185 |
| 4,291,751 | 9/1981 | Wolf | 165/185 |

FOREIGN PATENT DOCUMENTS

| | | | |
|---|---|---|---|
| 0093402 | 11/1983 | European Pat. Off. | 165/53 |
| 469926 | 12/1928 | Fed. Rep. of Germany | 237/69 |
| 0057137 | 4/1985 | Japan | 165/47 H |
| 0057138 | 4/1985 | Japan | 165/47 H |
| 0285325 | 12/1986 | Japan | 165/53 |

*Primary Examiner*—John K. Ford
*Attorney, Agent, or Firm*—Panitch Schwarze Jacobs & Nadel

[57] ABSTRACT

A device for heat supply is disclosed having a heat absorber connected to a heat emitter via a heat conductor. The heat absorber collects the throw-away heat bound in the vicinity of the ceiling and transfers it via insulated metal core (that is, the heat conductor) to be emitted proximate the floor. This makes a sizable energy saving while no maintenance is required, and cold feet at home or in the office can be avoided throughout the year.

6 Claims, 2 Drawing Sheets

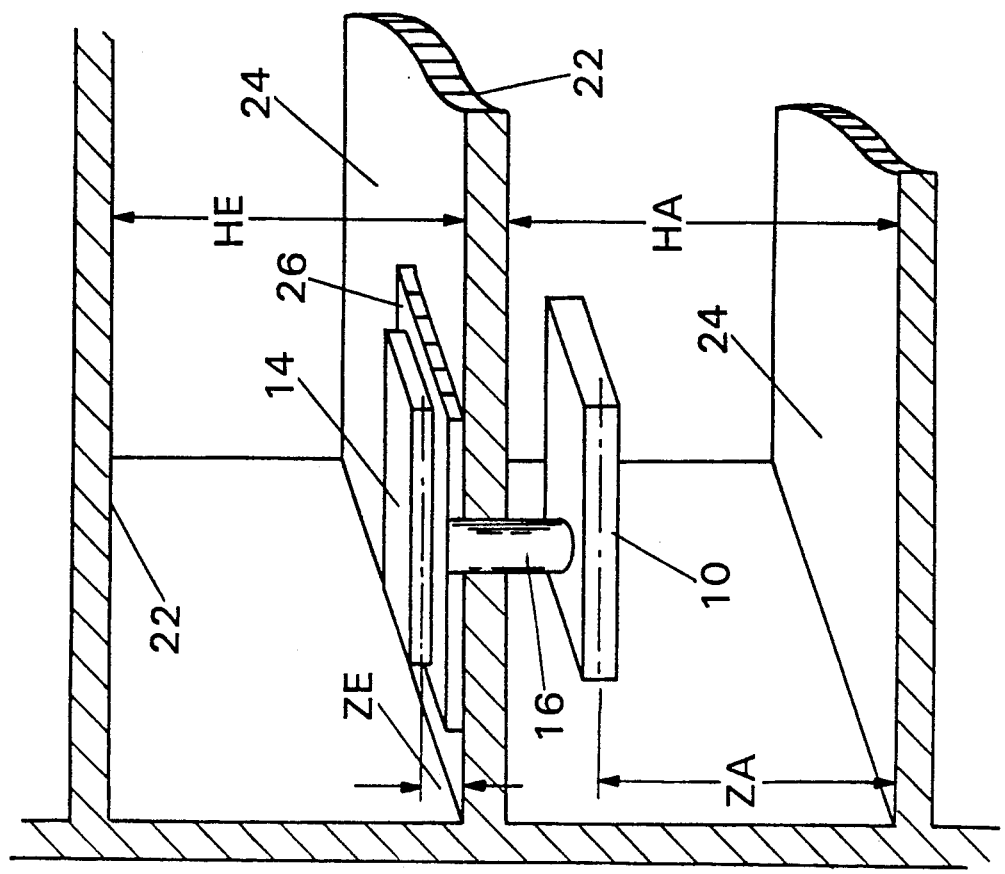
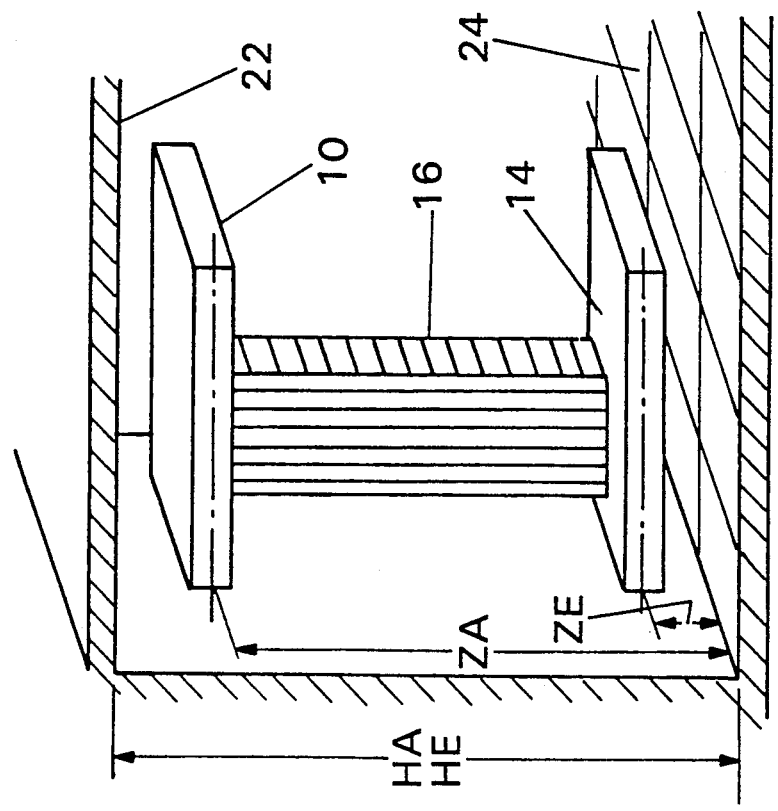

DEVICE FOR HEAT SUPPLY BY CONDUCTIVE HEAT TRANSFER

This is a continuation-in-part application of pending application Ser. No. 07/732,556, filed Jul. 19, 1991 now abandoned.

BACKGROUND OF THE INVENTION

1. Field of the Invention

The present invention relates to heat supply, particularly for creating more comfortable conditions for those inside a room or house.

2. Description of the Prior Art

A common winter season's complaint in many an apartment is on one's feet feeling "nearly frozen". At the same time, the upper space of that very apartment may be found overheated. As a matter of fact, a cold season temperature gap between the two levels often amounts to 8 to 12 degrees centigrade, the temperatures taken around the ceiling and floor levels, respectively.

The problem is that human beings cannot hover under the warm ceiling, rather their feet touch the cold floor.

Conventional heat supply devices exist which provide heat to different parts of a room. Some conventional heat supply devices achieve heat transportation by circulating a fluid or air, or perhaps by using a conveyor belt, wherein the circulating fluid, air, or conveyor belt transports heat from one location to another. However, such conventional heat supply devices are flawed because they require power for operation. Such conventional heat supply devices are further flawed because they require regular maintenance (since they contain moving parts).

Other conventional heat supply devices include particular heat sources and/or complicated, customized heat absorbers which are specifically adapted to absorb the heat generated by a particular heat source, such as a fluorescent light. Such conventional heat supply devices are flawed because they are limited to absorbing the heat from the particular heat source—they cannot absorb the heat from any other heat source. Such heat supply devices are further flawed because they require a separate power supply to power the heat generating source (such as the fluorescent light).

Therefore, what is required is a versatile heat supply device which:

(1) does not contain any moving parts, and does not run or circulate any heat exchange matters;

(2) does not require a power supply to achieve heat transportation, or to power a heat generating source.

Accordingly, it is an object of my invention to provide a device for more efficient heat supply to those inside a room or house.

It is another important object of the invention to achieve the preceding object by providing an energy saving device which meets the above-mentioned requirements.

Further objects and advantages of the invention will become apparent from a consideration of the drawings and ensuing description of them.

SUMMARY OF THE INVENTION

Briefly, the present invention is directed to a device for heat supply. The heat supply device includes a heat absorber for absorbing heat of any origin accumulated in a first room having a height HA. The heat absorber has a mass center which is vertically positioned ZA from the floor of the first room. The device also has a heat emitter for emitting heat to a second room having a height HE. The heat emitter has a mass center which is vertically positioned ZE from the floor of the second room. The heat supply device further includes a static heat conductor which extends between the heat absorber and the heat emitter and which transfers to the heat emitter substantially all of the heat received by the heat conductor from the heat absorber. According to the present invention, the heat absorber is mutually disposed relative to the heat emitter, wherein the mutual disposition is defined by the following relationship:

$$ZA/HA > ZE/HE.$$

BRIEF DESCRIPTION OF THE DRAWINGS

The foregoing summary, as well as the following detailed description, is better understood when read in conjunction with the appended drawings. For the purpose of illustrating the invention, an embodiment which is presently preferred is shown in the drawings. It is understood, however, that this invention is not limited to the precise arrangements and instrumentalities shown. In the drawings:

FIG. 1 is a perspective view of the device for heat supply according to a first embodiment of the present invention.

FIG. 2 is a perspective view of the device for heat supply according to a second embodiment of the present invention.

Figure 3:
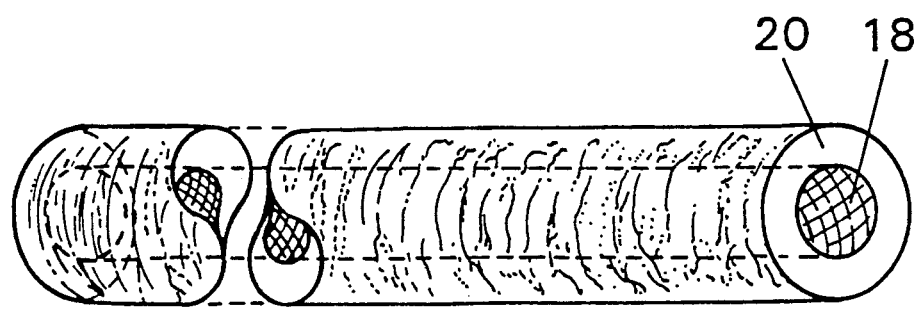
FIG. 3 is a schematic structure of one embodiment of the heat conductor of the invention.

REFERENCE NUMERALS IN THE DRAWINGS 10 heat absorber
14 heat emitter
16 heat conductor
18 heat conductor thermal conductive core
20 heat conductor thermal insulating casing
22 ceiling of the room
24 floor of the room
26 thermal insulating layer

DESCRIPTION OF THE PREFERRED EMBODIMENTS

Referring to FIGS. 1 and 2, a solid body of the heat absorber 10 is thermally connected to the heat emitter 14 via the heat conductor 16. The vertical position of the mass center of the heat absorber 10 above the floor 24 is denoted by vertical coordinate ZA, and that of the mass center of the heat emitter 14 is denoted by vertical coordinate ZE. HA and HE denote vertical distances between the floors and the ceilings (or heights) of the respective rooms enclosing the heat absorber 10 and the heat emitter 14 (in case of both the heat absorber 10 and the heat emitter 14 positioned inside the same room, as shown in FIG. 1, HA=HE).

According to the present invention, mutual disposition of the heat absorber 10 and heat emitter 14 is provided so that the following relationship is satisfied:

$$ZA/HA > ZE/HE.$$

The mutual disposition relationship must be satisfied whether the heat absorber 10 and heat emitter 14 are in the same room (as shown in FIG. 1) or different rooms (as shown in FIG. 2). It is the satisfaction of the mutual disposition relationship which enables the present device for heat supply to operate without any particular heat generating source. Indeed, the mutual disposition relationship provides that the heat absorber 10 is positioned relatively higher, in proportion to the height of the enclosing room, than the heat emitter 14 and, hence, due to the natural phenomenon of the vertical temperature gradient existing inside a room, the temperatures around the heat absorber 10 are relatively higher than those around the heat emitter 14.

At the same time, the upper domain of the room interior, e.g., proximate the ceiling, is normally unmanned, and therefore the heat existing there is of little use to those living in the room.

Hence, the elevated heat absorber 10 actually absorbs throw-away or waste heat regardless of its origin. (It certainly goes without saying, that the more energy is spent to power a particular heat source, the higher may rise the temperature in the room. But this is a completely different doctrine. The objects and principles of the present invention have nothing to do with heat sources, as follows from the appended claims). So, unlike some conventional heat supply devices, the present invention does not require energy to power any heat generating source, nor does the present invention require a complicated, customized heat absorber which is specially adapted for absorbing heat from a particular heat source.

The construction of the heat absorber 10 is extremely simple. It comprises a solid body of high thermal conductive metal (e.g. aluminum) which takes the temperatures of the surrounding warmer (and, hence, lighter) air bound in the upper portion of a room. The shape of the heat absorber 10 is rather arbitrary and can be designed to decorate the room. It is advisable, however, to provide some continuous decline in thickness outwards from the point of its connection to the heat conductor 16 so as to gain more heat carrying capacity without increasing of the weight of the heat absorber 10.

The absorbed heat is conveyed through the thermal conductive heat conductor 16 to the heat emitter 14 placed onto thermal insulating layer 26 proximate the floor 24. It is here where higher temperatures are most wanted throughout the cold season. To meet the need, the heat emitter 14 radiates the wasted heat collected by the heat absorber 10. The heat emitter 14 may be a single metal plate (or a combined plastic-and-metal plate) having high thermal conductive properties. It may also be considered practical to supply a room with a number of small sized heat emitters 14 (not shown) represented by metal, or combined plastic-and-metal, plates to be placed at will of each individual. A transportable heat emitter switched to the main, that is to the heat conductor 16, by an isolated metal connector, is optional too.

It is most essential that substantially all the borrowed heat (that is, the heat absorbed by the heat absorber 10) is provided to get through to directly supply those concerned. This is one very important advantage of the invention over traditional fans, or the like, which cause the heat to dissipate over the whole bulk of the interior with only a small fraction left to get to the destination (which is, literally, the feet of the dweller).

Referring to FIG. 3, the inner part, or the core 18, of the heat conductor 16 is made of substantially high thermal conductive metal, e.g., aluminum, and has a sufficient cross sectional area to provide a stationary transfer of the heat received from the heat absorber 10. According to the present invention, the heat transportation is provided entirely as a result of the collisions between the free electrons moving through the crystal lattice of the metal core 18 and the ions of the lattice, and not by the transfer of matter.

The core 18 is enclosed by an exterior casing 20 made of substantially thermal insulating matter to provide the transfer to the heat emitter 14 of a substantial part of the heat received by the heat conductor 16 from the heat absorber 10.

It should be noted that the heat conductor 16 contains no moving parts and does not require a power supply for operation. Thus, the heat conductor 16 is fundamentally unlike conventional heat supply devices which achieve heat transportation by transferring various heat exchange matters. Specifically, conventional heat supply devices achieve heat transportation by circulating a fluid or air, or perhaps a conveyor belt, wherein the circulating fluid, air, or conveyor belt transports heat from one location to another. As will be appreciated by those skilled in the art, such conventional heat transportation devices require power for operation. They also require regular maintenance (since they contain moving parts and circulate heat exchange matters). Since the stationary heat conductor 16 of the present invention does not include any moving parts and does not transport heat exchange matter, the heat conductor 16 does not require a power supply for operation and does not require maintenance.

From the description above, the reader will see that the device for heat supply of this invention is energy saving.

Indeed, a well-known problem in winter is that the cooler the ambient air in the room, the shorter is the time during which the produced heat interacts with a human body. The heat then goes upwards off the body, and more heat is then required to be produced to make up for the loss.

To the contrary, the device of the present invention makes use of this very phenomenon to prolong the period in question. In particular, the present invention is adapted for collecting the waste heat and bringing it down to the living area, without regard to its source or origin, including that radiated by the freezing dweller himself.

Additional advantages of the device of the present invention, as compared to prior art, are as follows:

It is completely static and contains no moving parts, hot or leaking agents; it is one hundred percent safe and foolproof.

It operates by itself, requires little if any maintenance and has a very long, practically unlimited service life.

It creates no noise, vibration, air pollution and, not the least important, it is extremely simple to manufacture, install and use.

It will be evident to those skilled in the art that the invention is not limited to the details of the foregoing illustrative embodiment and that the present invention may be embodied in other specific forms without departing from the spirit or essential attributes thereof.

For example, the number, size, shape, and mutual combinations of heat conductors, absorbers and emitters inside one or different rooms or buildings can vary. Thus, to position the heat absorber 10 at a lower floor next to the heat emitter 14, as illustrated in FIG. 2, will save the length and weight of the heat conductor 16 and reduce the transferred heat losses. This is especially convenient for prefabricated devices built in a construction of multistory buildings or apartments. On the other hand, the device can as well be easily assembled and embodied as a transportable option.

Furthermore, the metal core 18 of the heat conductor 16 can comprise a plug (not shown) to control or stop the heat flow, if desirable. The plug can be implemented as a partially or completely withdrawable part of the cross-section of the metal core 18 inside the insulating casing 20. Thus, the plug can be adjusted to vary the cross-sectional area of the core 18 and to thereby control the volume of the heat supply.

Also, the thermal insulating casing 20 of the heat conductor 16 can be implemented as a vacuum or "thermos" flask. Then, a semiconductor heat-flow-to-electric-current converter can be included to generate a constant byproduct electric current.

While preferred embodiments of the present invention have been described and certain modifications thereto suggested, one of ordinary skill in the art will appreciate that other changes can be made without departing from the broad inventive concepts thereof. It should be understood, therefore, that the invention is not limited to the particular embodiments disclosed, but is intended to cover any modifications which are within the scope and spirit of the invention as defined by the appended claims.

What is claimed is:

1. A device for heat supply comprising:
a heat absorber having a metal body and disposed within a first room having a height HA and a floor, the heat absorber having a mass center which is vertically positioned ZA from the floor of the first room, said heat absorber absorbing accumulated heat in the first room;
a heat emitter disposed within a second room having a height HE and a floor, the heat emitter having a mass center which is vertically positioned at a height ZE from the floor of the second room, said heat emitter emitting heat received from the heat absorber; and
a static heat conductor comprising a body of substantially high thermal conductive metal and an outer casing of substantially high thermal insulating material and extending between the heat absorber and the heat emitter, said conductor transferring to the heat emitter substantially all of the heat received by the heat conductor from the heat absorber by conductive heat transfer, wherein the following relationship is satisfied:

ZA/HA>ZE/HE.

2. A device for heat supply comprising:
a heat absorber having a metal body and disposed within a room having a height HA and a floor, the heat absorber having a mass center which is vertically positioned at a height ZA from the floor of the room, said heat absorber absorbing heat accumulated in the room;
a heat emitter disposed within the room, the heat emitter having a mass center which is vertically positioned at a height ZE from the floor of the room, said heat emitter emitting heat received from the heat absorber; and
a static heat conductor comprising a body of substantially high thermal conductive metal and an outer casing of substantially high thermal insulating material and extending between the heat absorber and the heat emitter, said conductor transferring to the heat emitter substantially all of the heat received by the heat conductor from the heat absorber by conductive heat transfer, wherein the following relationship is satisfied:

ZA>ZE.

3. A device for heat supply comprising:
a heat absorber having a metal body disposed within a room having a height HA and a floor, the heat absorber having a mass center which is vertically positioned at a height ZA from the floor of the room within which said heat absorber is located, said heat absorber for absorbing accumulated heat in the room;
a heat emitter disposed within a room having a height HE and a floor, the heat emitter having a mass center which is vertically positioned at a height ZE from the floor of the room within which said heat emitter is located, said heat emitter for emitting heat received from the heat absorber; and
a static heat conductor comprising a body of substantially high thermal conductive metal and an outer casing of substantially high thermal insulating material and extending between the heat absorber and the heat emitter, said conductor transferring to the heat emitter substantially all of the heat received by the heat conductor from the heat absorber by conductive heat transfer, wherein the following relationship is satisfied:

ZA/HA>ZE/HE.

4. The device as recited in claim 3 wherein said heat emitter is separated from the floor of the room within which the heat emitter is located by a thermal insulating material.

5. The device as recited in claim 3 wherein said heat absorber and said heat emitter are located in the same room.

6. The device as recited in claim 3 wherein said heat absorber and said heat emitter are located in separate rooms.

* * * * *